July 6, 1965   C. HUETTEN ETAL   3,193,611
ELECTRONIC PELLET WITH END TERMINALS
Filed Jan. 28, 1963   7 Sheets-Sheet 3
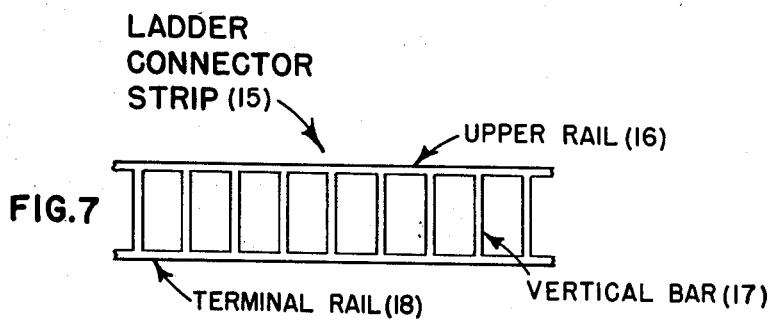
FIG.7
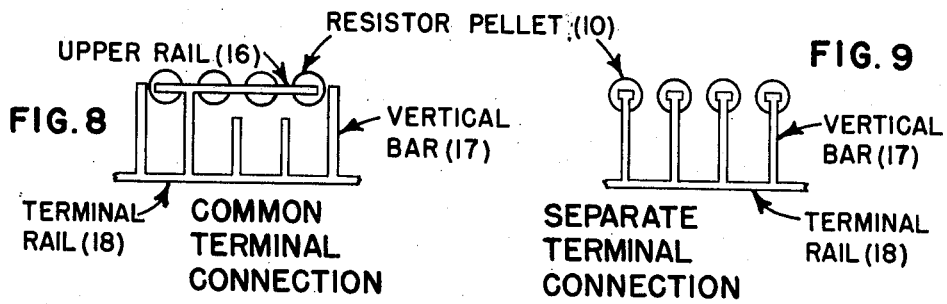
FIG.8 — COMMON TERMINAL CONNECTION
FIG.9 — SEPARATE TERMINAL CONNECTION
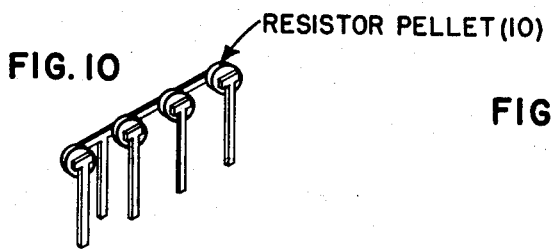
FIG.10
COMMON TERMINAL NETWORK
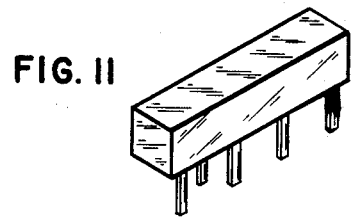
FIG.11
COMMON TERMINAL NETWORK ENCAPSULATED
INVENTORS
CLARENCE HUETTEN
ROBERT L. MEEK
LOUIS P. SWEANY
BY
ATTORNEY

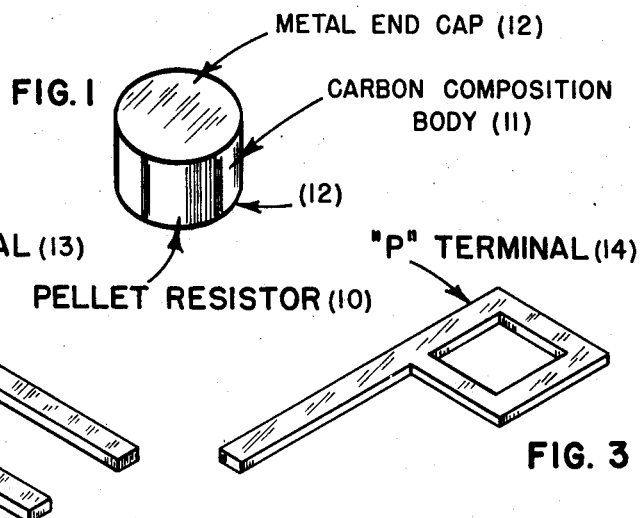
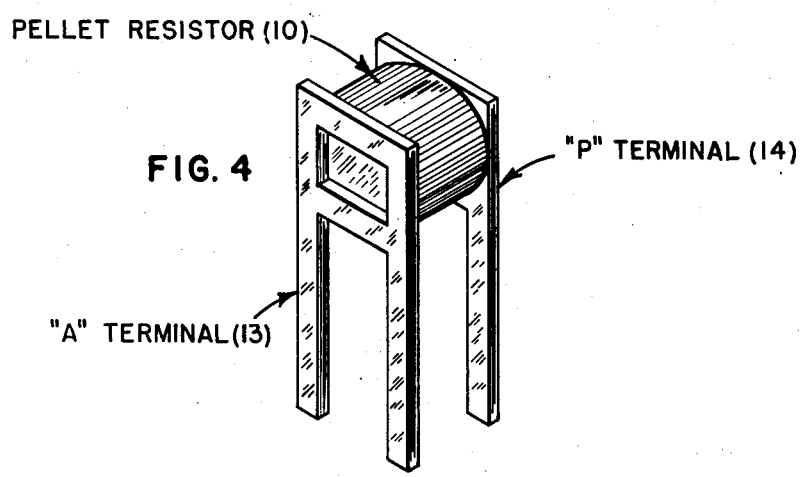
TERMINALS FOR SINGLE PELLET

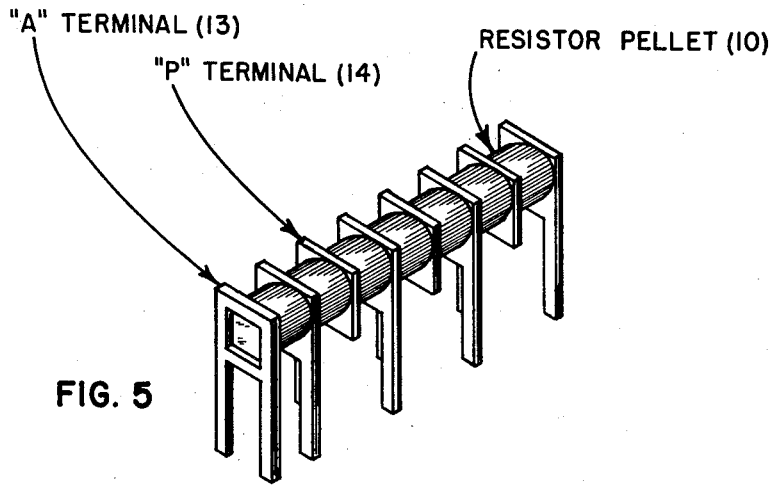
FIG. 5
SERIES-CONNECTED PELLETS
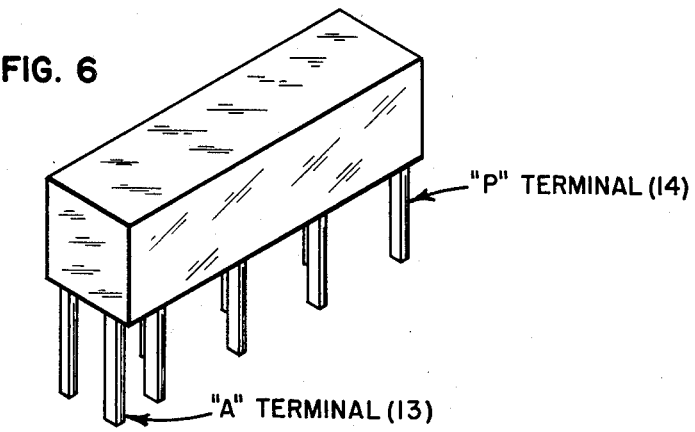
ENCAPSULATED SERIES NETWORK

FIG. 12
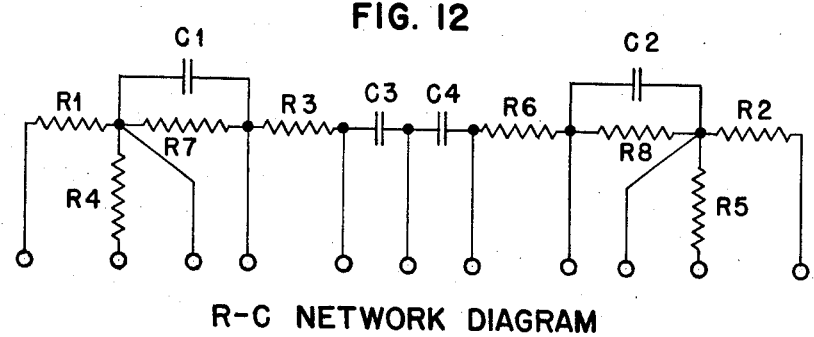
R-C NETWORK DIAGRAM
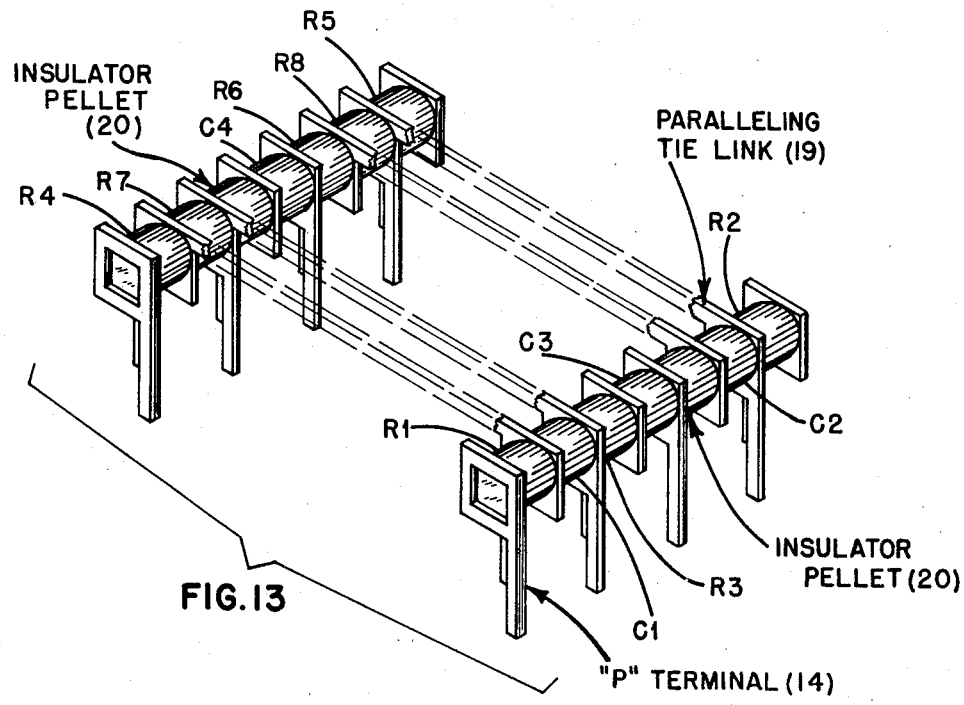
FIG. 13
R-C NETWORK MODULE

UNIVERSAL CONNECTOR STRIP (21)

U.C.S. CONDUCTORS WITH PELLETS ATTACHED

July 6, 1965  C. HUETTEN ETAL  3,193,611
ELECTRONIC PELLET WITH END TERMINALS
Filed Jan. 28, 1963  7 Sheets-Sheet 6

PARALLEL TEE NETWORK DIAGRAM

PARALLEL TEE NETWORK MODULE

INVENTORS
CLARENCE HUETTEN
ROBERT L. MEEK
BY LOUIS P. SWEANY

ATTORNEY

July 6, 1965 C. HUETTEN ETAL 3,193,611
ELECTRONIC PELLET WITH END TERMINALS
Filed Jan. 28, 1963 7 Sheets-Sheet 7

TYPICAL CIRCUIT TERMINAL (24)

THREE-DIMENSIONAL PELLET ASSEMBLY

INVENTORS
CLARENCE HUETTEN
ROBERT L. MEEK
BY LOUIS P. SWEANY

ATTORNEY

United States Patent Office 3,193,611
Patented July 6, 1965

3,193,611
ELECTRONIC PELLET WITH END TERMINALS
Clarence Huetten, Indianapolis, Robert L. Meek, Greensburg, and Louis P. Sweany, Indianapolis, Ind., assignors to P. R. Mallory & Co., Inc., Indianapolis, Ind., a corporation of Delaware
Filed Jan. 28, 1963, Ser. No. 254,298
2 Claims. (Cl. 174—50)

This invention relates generally to electronic networks and has specific application to the means and method for producing a microminiaturized module package having high component density and being capable of myriad variations in circuitry.

The concept of microminiaturization as applied to the electronics industry has afforded a means for producing compact networks having remarkably high volumetric efficiency. Where parameters of size and weight are critical, the components which comprise the circuit or network will ideally be of microminiaturized construction, such components being familiarly classified as "microcomponents," and the resulting circuits being known as "microcircuits."

The broad field of microminiaturized networks can be divided into two main categories, viz., modular circuitry and molecular circuitry. Modular circuitry, which utilizes discrete components, combines the maximum in size reduction with the minimum change in component design philosophy. It includes any microminiaturization methodology wherein the individual components, although reduced in size, can be separately manufactured, tested, and marketed. Molecular circuitry, on the other hand, utilizes integrated components in the form of thin films, deposited circuits, or functional semiconductor blocks.

The present invention, which is placed within the category of modular circuitry, employs a discrete microcomponent in the shape of a cylindrical pellet. It has been found that the cylindrical pellet provides an ideal shape for the single circuit element, whether it be a resistor, capacitor, diode, or transistor. Pelletized components are simple, small, producible, reliable, economical, and readily adaptable to the formation of electronic networks known as modules. Leadless pelletized circuit elements are particularly adaptable to automatic handling techniques in pre-assembly testing, and in assembling groups of elements into microcircuits.

Although pellets of any desired size may be assembled in a wide variety of methods to form electronic networks or modules, the present invention employs a uniform pellet size having dimensions which readily adapt it to a widely accepted grid system. Furthermore, the method used for assembling the individual pellets into modular networks is systematically controlled to provide module sizes and shapes which produce excellent fits, thereby attaining the objective of extremely compact equipment. This novel system permits the evolution of simple to complex pellet assemblies while preserving the qualities of simplicity, high component density, miniaturization, producibility, economy, design flexibility, and reliability in the final module.

An object of the present invention, therefore, is to provide the means and method for creating electronic networks of high component density through use of novel microcircuit modular packaging.

Another object of the present invention is to provide modular packaging which utilizes pelletized microcomponents having uniform element size, resulting in a center-to-center terminal spacing conforming to a widely accepted grid system.

Another object of the present invention is to produce single-dimensional and multi-dimensional modules in the shape of a rectangular parallelepiped, said shape being recognized as ideal for an assembly of circuit elements. With all terminal leads emerging from one face of the module for convenient assembly, and with module sizes systematically controlled to provide optimum fits, the objective of miniaturized equipment is readily achieved.

Yet another object of the present invention is to provide a novel flat terminal construction which is ideally suited for single-pellet or multiple-pellet attachment, and which features large contact area, high heat release, ease of production, economy, polarity identification, and adaptability to automatic assembly techniques.

Yet another object of the present invention is to provide a simple connector strip which effectively joins pellets in circuits requiring parallel-connected components or components having one terminal common.

Still another object of the present invention is to provide a system for conveniently making complex pellet interconnections within the module, said system utilizing a die-cut grid device proprietarily called a "Universal Connector Strip" or "U.C.S.," by applicants. Extreme flexibility of circuit design is thereby attainable by simply selecting pelletized components of any desired value, and using the appropriate connector strip configuration.

Still another object of the present invention is to exploit a novel method for obtaining optimum fits among groups of modules, herein called a "binary modulator dimension system."

Yet another object of the present invention is to show adaptability of the pellet assemblies to mold casting or potting in an insulating shell. Circuit elements are completely encapsulated for physical and environmental protection, while full control of the external modular dimensions is maintained.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in connection with the accompanying figures of the drawing and wherein like reference characters describe elements of similar function therein and wherein the scope of the invention is determined rather from the dependent claims.

For illustrative purposes, the invention will be described in connection with the accompanying drawing wherein all microminiaturized elements are greatly enlarged for clarity, and in which:

FIGURE 1 is a perspective view of a microminiaturized pellet resistor which constitutes a typical circuit element in this invention.

FIGURE 2 is a perspective view of a dual-legged flat terminal member identified as the "A" terminal.

FIGURE 3 is a perspective view of a single-legged flat terminal member identified as the "P" terminal.

FIGURE 4 is a perspective view of the pelletized resistor element with the terminal members of FIGURES 2 and 3 attached thereto.

FIGURE 5 is a perspective view of seven pelletized circuit elements in a single-row, end-to-end, series-connected assembly, with terminal members attached.

FIGURE 6 is a perspective view of the module shown in FIGURE 5 after encapsulation of the circuit elements.

FIGURE 7 is a plan view of a "ladder" connector strip segment used for side-by-side, parallel-connected, pellet networks.

FIGURE 8 is a plan view of a "ladder" connector strip segment configured for common terminal connection of four resistor pellets.

FIGURE 9 is a plan view of a "ladder" connector strip segment configured for separate terminal connection of four resistor pellets.

FIGURE 10 is a perspective view of the side-by-side parallel-connected, four-pellet network constructed from the "ladder" connector members of FIGURES 8 and 9.

FIGURE 11 is a perspective view of the module shown in FIGURE 10, after encapsulation of the circuit elements.

FIGURE 12 is an electrical circuit diagram of an R-C network commonly found in bistable multivibrator circuits, comprising twelve circuit components capable of modular assembly.

FIGURE 13 is a perspective view of the resulting two-dimensional modular assembly corresponding to the circuit diagram of FIGURE 12. The individual pellet stacks, which are interconnected by means of four parallel tie links, are shown separated for purposes of clarity.

Figure 14:
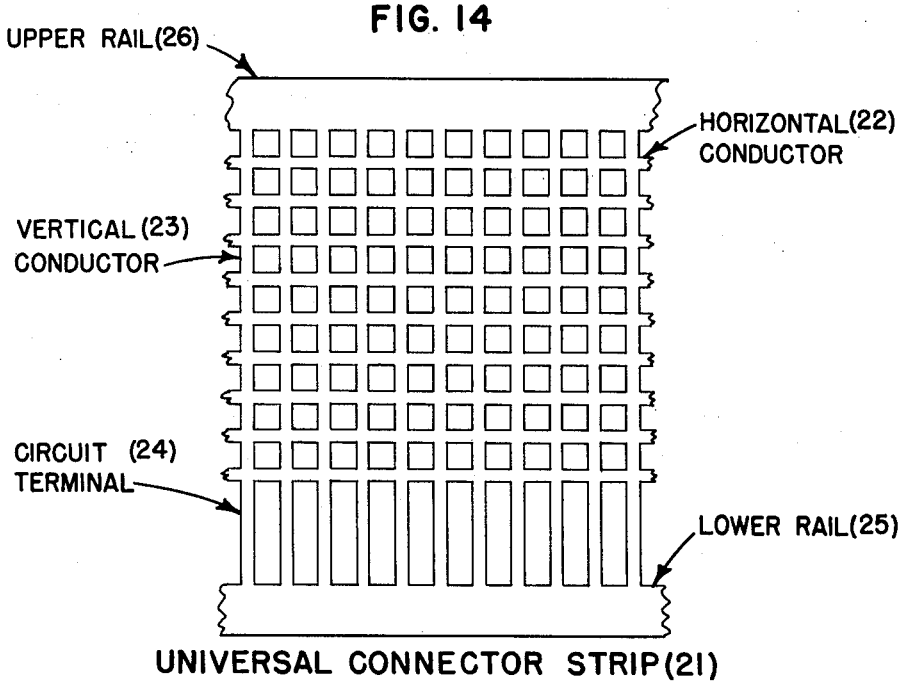
FIGURE 14 is a fragmentary plan view of the "Universal Connector Strip."

Generally speaking, the present invention provides the means and method for economically and efficiently creating electronic networks of high component density through use of pelletized microminiature circuit elements having uniform size. By means of a novel system of termination, interconnection, and assembly geometry, the resulting module possesses a remarkably compact and versatile configuration which contributes a substantial advancement in the modular circuitry art.

Accordingly, in the microminiature electronic network described herein, there is provided a plurality of individual circuit elements shaped as cylindrical pellets, each of microminiaturized construction and each having a uniform diameter and thickness. To each conductive end disc of the pellet may be attached a flat terminal member which lies in a plane parallel to the face of the disc. The terminal member features a square head portion having outside dimensions equivalent to the diameter of the pellet and a central portion thereof cut out. Integral with the square head portion, and extending thereferom in the same plane, are legs of the terminal member which serve to terminate the circuit component, define polarity, and align and orient the network assembly. Internal connections in a multiple-pellet configuration are made within the module using appropriate portions of a "Universal Connector Strip," or, in certain instances, using a "ladder" connector strip. All terminals, regardless of the network complexity, are made to emerge from only one face of the module in order to expedite assembly of the equipment. One-dimensional, two-dimensional, or three-dimensional pellet assemblies may be efficiently produced by the means and method of this invention, resulting in extremely high component density in the final module, while permitting myriad variations in circuit design.

Six embodiments of the present invention will be described in detail herein as being illustrative of the special features to be ultimately claimed. The chosen embodiments will be presented in the following sequential steps to illustrate the evolution of simple to complex modular circuitry: (a) the single pellet circuit component with terminal members attached; (b) a single-dimensional row of pellets forming a series-connected network; (c) a single-dimensional row of pellets forming a parallel-connected network; (d) a two-dimensional assembly of pellets forming an R-C network; (e) a two-dimensional assembly of pellets forming a parallel T network; (f) a three-dimensional assembly of pellets forming a complex network.

Referring now to the drawings, FIGURE 1 shows a microminiaturized pellet resistor 10 which is identical in size and shape to any desired circuit element, whether it be a capacitor, diode, resistor, or transistor. The typical resistor of FIGURE 1 features a carbon composition body 11 of cylindrical shape, with integrally molded metal end caps 12 shaped as discs. The size of the pellet circuit elements to be used in all of the terminating and assembly methods herein described is 0.100 inches in diameter by 0.063 inch thick. These dimensions have been established in consideration of the following factors: the economics of producibility; adaptability to hand and automatic assembly; element ratings and performance; interconnection techniques; and assembly terminations.

FIGURE 2 shows one of two basic terminal configurations, being identified as the "A" terminal 13. The terminal member is made of solder-coated copper and is formed in the shape of a flat letter "A." The square head section of terminal member 13 has an outside dimension substantially equivalent to the diameter of the pellet. This permits simple fixturing for accurate location on the pellets during assembly, and the square hole provides space for excess solder when the assembly is made by soldering. The "A" terminal 13 is standard for one terminal of all single pellet elements and is used for polarity identification where required.

FIGURE 3 shows the second terminal configuration which is identified as the "P" terminal 14. Being formed in the shape of a flat letter "P," it is otherwise equivalent to the "A" terminal 13. These flat terminals have several fundamental advantages. They are economical to fabricate, and individual handling is eliminated by leaving the terminals in strip form for multiple assembly. The flat terminal presents a relatively large area to the pellet face 12, and by using copper material intimately bonded to the pellet by soldering, a low thermal resistance path is obtained for removal of heat from the pellet.

FIGURE 4 shows "A" terminal 13 and "P" terminal 14 assembled to pellet 10. To obtain a center-to-center terminal spacing conforming to an acceptable grid system, the terminal material thickness is made 0.012 inch. When these terminals are assembled to the 0.063 inch pellet, the spacing becomes 0.075 inch, which conforms to the widely accepted 0.025 inch grid system. The two legs on "A" terminal 13 also have a 0.075 inch center-to-center spacing.

In that the terminal material is solder-coated copper, no additional solder is required to make the bond when forming the assembly shown in FIGURE 4. Multiple assembly of terminals to pellets has been efficiently accomplished on a resistance soldering press. The pellets are positioned on 0.150 inch centers in a nest, and a strip of "A" terminals is located on the pellet faces. Upon activating the press, a carbon electrode contacts the terminal over the pellet and a spring contactor presses against the terminal tie strip. A timed electrical pulse applied to this circuit heats the terminal at the carbon electrode, causing the solder to flow. A "hold time" in the soldering head allows the joint to cool before the electrode is lifted from the work. The partial assembly is then removed from the nest and turned over to receive a strip of "P" terminals, which are attached in the same manner. The posts are then cut loose from the tie strip using a floating plate shear which clamps the terminals so that shearing stresses are not transmitted to the pellet faces. Final encapsulation for mechanical and climatic protection is performed with a multiple cavity mold, using a suitable compound such as an epoxy resin. The single pellet components are molded into a 0.150 inch cube, which becomes the basic modular dimension for other packages.

The next step beyond the single pellet configuration is the formation of a one-dimensional row of pellets. A single-row, end-to-end arrangement of pellets is applicable to circuits requiring series-connected components. Many elements in a circuit, such as an amplifier or a bistable multivibrator, are found to be in series, and groups of these elements may be packaged and interconnected to form modules. FIGURE 5 shows an assembly of seven series-connected resistor pellets 10 used as a voltage divider network. The terminal members in this assembly are the same as those used for the single pellet. The "A" terminal 13 at one end of the assembly provides orientation or keying of the module to prevent improper connections. The "P" terminals 14 are alternated down the series string to obtain a staggered 0.075 inch spacing.

Formation of the assembly shown in FIGURE 5 can be expedited by leaving the respective terminals tied to a base strip. Bonding of the solder-coated terminals to the pellet faces is accomplished by applying pressure to one end of the assembly while heating the terminals to melt the solder. The terminal base strip is thereupon removed. When encapsulated, as shown in FIGURE 6, this seven-pellet assembly has the dimensions 0.150 inch x 0.150 inch x 0.600 inch. An insulator having the same size as a pellet may be used in the series string to isolate two separate circuits in the same package, with little resultant reduction in component density. Because a plurality of terminals is contained on each base strip, multiple assembly of the series network of FIGURE 5 is readily achieved.

A variation of the single-row series stack of FIGURE 5 is applicable to circuits requiring parallel-connected components or components having one terminal common. This is accomplished by the formation of a single-row, side-by-side arrangement of pellets. A typical application is the resistor network used in transistor collector supply circuits. FIGURE 7 illustrates a "ladder" connector strip 15 which serves as the means for joining and terminating a single row of parallel-connected or common terminal pellets. Ladder connector strip 15 is made of solder-coated copper to permit bonding to the pellet by means of resistance soldering. One upper rail 16 and the vertical bars 17 of strip 15 are active conductors. The lower rail, called the terminal rail 18, is ultimately removed. The vertical bars 17, which are 0.250 inch long and 0.025 inch wide, are spaced apart on 0.150 inch centers so that the resulting terminals will conform to a 0.025 inch grid system. Similarly, the thickness of the strip material is 0.012 inch so that, when attached to each side of a 0.063 inch thick pellet, the terminal centers are spaced exactly 0.075 inch.

FIGURE 8 and FIGURE 9 serve to illustrate the use of ladder connector strip 15 for connecting a simple four-pellet resistor network, although the same technique is applicable to any combination of resistors, capacitors, or diodes. Referring to FIGURE 8, the common side of the circuit is prepared by removing all but one of vertical bars 17 from upper rail 16. The four resistor pellets 10 are separately nested in a row on 0.150 inch centers, after which the common connector circuit half is centered on the pellets and resistance soldered thereto, producing the sub-assembly of FIGURE 8. Location of the common terminal is optional, but it should properly fall between two pellets so as to provide maximum space for making connection to the terminal.

Referring to FIGURE 9, small sections of upper rail 16 are removed from another segment of ladder connector strip 15 so that vertical conductors 17 may be used as separate resistor terminals. Thereupon, the sub-assembly of FIGURE 8 is turned over to expose the opposite terminal face of resistor pellets 10. The row of vertical conductors is then centered on the pellet terminal faces and resistance soldered thereto. Terminal rail 18 on both circuit halves is then separated from the assembly, producing the resistor network seen in FIGURE 10.

FIGURE 11 shows the final module of FIGURE 10 after encapsulation. The encapsulated size of this network is 0.150 inch wide by 0.150 inch high by 0.600 inch long, the length being a multiple of the 0.150 inch basic modular size. Thus, the ladder connector strip 15 offers a means of universal connections for a group of relatively simple networks, and it fulfills the need for producing new circuits rapidly without complex tooling. Circuit modification caused by design changes may be made with negligible cost penalty. Furthermore, the yield of pellet assemblies is high because all circuit elements may be tested before assembly.

In the evolution of simple to complex modular circuitry, the next step beyond the single row of pellets is a two-dimensional pellet arrangement. The first of this type to be considered herein is a combination of the side-by-side and end-to-end pellet arrangements previously disclosed. Two-dimensional assemblies of this type are appropriate where several parallel elements appear in a circuit that is basically a series circuit. The major advantages of this configuration are that a single package may be used instead of several simpler packages, and that the number of external interconnections is reduced. FIGURE 12 is an electrical circuit diagram of an R-C network commonly found in bistable multivibrator circuits, comprising twelve circuit components, most of them in series but some in parallel, each being identified with an appropriate symbol. Such a circuit, if reduced to a modular network, would require a two-dimensional assembly of pellets.

FIGURE 13 shows the two-dimensional modular assembly corresponding to the circuit diagram of FIGURE 12, with the pellet components respectively identified by the same symbols used in the diagram. The distance between the two pellet stacks is exaggerated in this view so that the terminals may be seen more clearly. In actuality, the axial spacing of stacks is 0.150 inch. The terminals and assembly technique used for this configuration are substantially the same as those used in the series row of FIGURE 5, except that a paralleling link 19 is added in four locations. This tie link provides the cross-over between pellet rows, and permits convenient paralleling of elements where required. Insulator pellets 20 are composed of phenolic or ceramic material having metallized ends. These are soldered in the same manner as the other components to make a rigid assembly. When encapsulated, the module of FIGURE 13 is 0.150 inch high by 0.300 inch wide by 0.600 inch long.

In order to conform to the principle that all terminals should emerge from one face of the module for convenient assembly, special provisions are required for multi-dimensional arrays of pellets in more complex circuitry. Pellet interconnections in such cases are made with a "Universal Connector Strip" 21 shown in FIGURE 14. This strip, which is an expansion of a strip of "A" terminals, consists of a die-cut grid of solder-coated copper having 0.025 inch wide conductors on 0.075 inch centers, both horizontally and vertically. The strip shown in FIGURE 14 has nine horizontal conductors 22, bounded by upper rail 26, but the concept is not limited by this number. Each vertical conductor 23 has an elongated section below the lower horizontal conductor and above lower rail 25 which functions as a circuit terminal 24. The thickness of the strip material is 0.012 inch to allow the terminals spanned by a pellet thickness of 0.063 inch to fall on the 0.075 inch grid.

Figure 15:
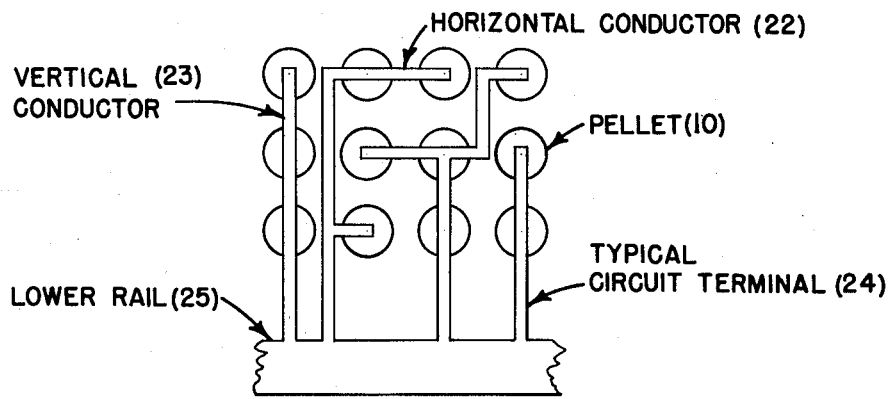
FIGURE 15 is a fragmentary plan view of the "Universal Connector Strip" showing portions of the grid removed to obtain a desired circuit routing, and showing the pellets attached thereto.

Universal Connector Strip 21 provides remarkable flexibility in circuit layout and component location. By placing the pellet components on 0.150 inch centers with each at the junction of a horizontal and a vertical conductor of strip 21, connections to each pellet may be made from four coplanar directions. The conductors on the 0.075 inch spacing between the pellets are then used for routing the circuit. Once the circuit paths have been established, the unwanted conductors are removed from the grid and the connector strip is ready for assembly to the pellets. FIGURE 15 shows such a connector strip after pellet attachment. The precise pattern of the conductor grid shown in FIGURE 15 will comprise the front side of a modular network to be subsequently described herein.

One of the major advantages of "Universal Connector Strip" 21 is its adaptability to short production runs of many circuit types. Through number and letter identification of each line and junction of the connector strip grid, a circuit may be transferred directly to a programmed punch which may be set up automatically or manually. A circuit change merely affects the punch program, and lead times for new circuits are greatly reduced. For prototype circuits where the unwanted portions of the grid are to be removed by a hand operation, a "ticket punch" may be effectively used for severing the conductor links while the adjacent grid hole is used for location.

Figure 16:
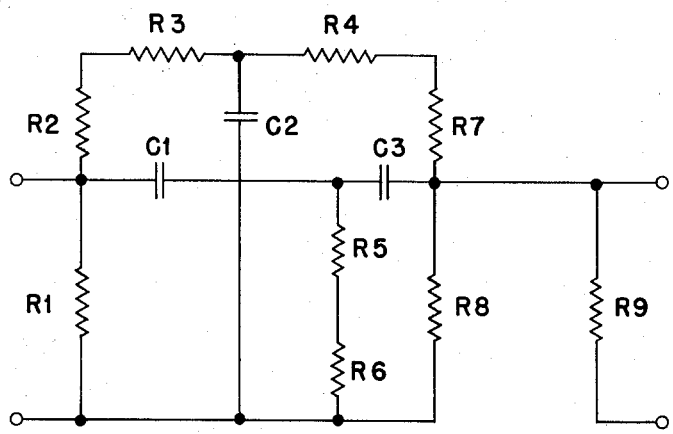
FIGURE 16 is an electrical circuit diagram of a typical parallel T network composed of twelve circuit components capable of modular assembly through use of the "Universal Connector Strip."
Figure 17:
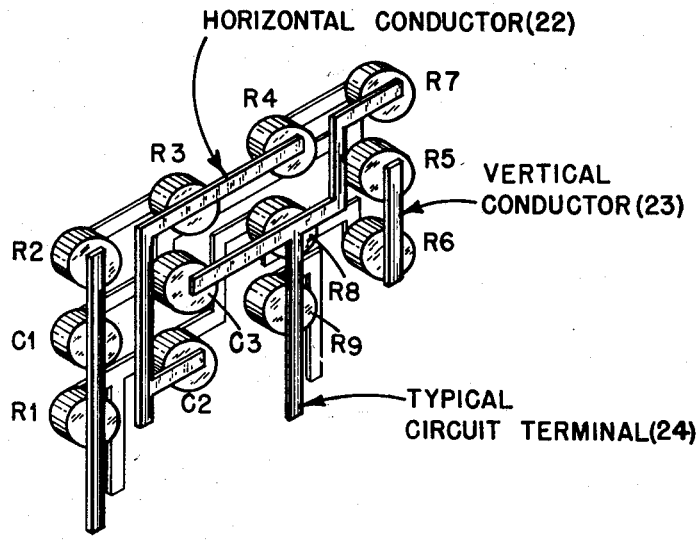
FIGURE 17 is a perspective view of the resulting two-dimensional modular assembly corresponding to the circuit diagram of FIGURE 16. Individual pellets, respectively identified, are joined by segments of the "Universal Connector Strip."

FIGURE 16 is an electrical circuit diagram of a typical parallel T network comprising twelve circuit components, some in series and some in parallel, each being identified with an appropriate symbol. Such a circuit, if reduced to a modular network, would require a two-dimensional pellet assembly with interconnections made by the "Universal Connector Strip" method. FIGURE 17 shows the assembled module corresponding to the circuit diagram of FIGURE 16, with the respective pellet components similarly identified. The conductor strips on the front side of the module shown in FIGURE 17 were transposed directly from the modified grid of FIGURE 15.

Referring to FIGURE 17, actual assembly of the circuit halves is accomplished by nesting the pellets on 0.150 inch centers in their proper location. The front half of the circuit is located on the pellet centers and electrical connections are made by resistance soldering or by conductive cement where soldering temperatures are prohibitive. The subassembly is then removed from the nest, turned over, and refixtured to attach the rear half of the circuit in a similar manner. Island tie strips are severed where appropriate, and the lower rail of each connector strip is removed to expose circuit terminals 24. Thereupon, the assembly is ready for cleaning, testing, and encapsulation. If it should be necessary to make direct connections between the two circuit halves, the crossover may be effected by various expedients. One method utilizes a pellet-size metal feed-through where space permits. In another method, a right angle bend is made in the conductor between pellets to provide an offset equal to the pellet thickness.

The 0.150 inch matrix used for assembling 0.100 inch diameter pellets in the arrangement seen in FIGURE 17 permits an alternate pellet diameter to be used for microcomponents requiring greater volume. A 0.250 inch diameter pellet, which will occupy the space of four 0.100 inch diameter pellets, may be introduced into the matrix without affecting the advantages of the concept, providing that the 0.063 inch pellet thickness is maintained. Furthermore, the pellet module shown in FIGURE 17 is adaptable to direct assembly to an appropriate substrate where the ultimate is desired for in-process mechanical rigidity and improved heat distribution. Low thermal resistance materials, such as beryllia oxide, can be extended beyond the package boundaries for connection to a heat sink.

Figure 18:
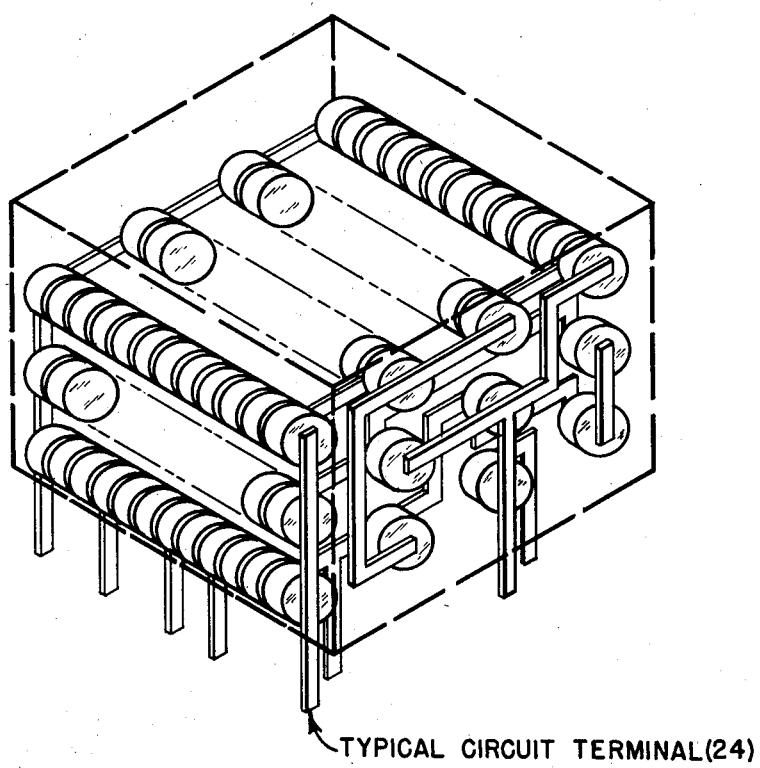
FIGURE 18 is a perspective view of a complex module comprising a three-dimensional assembly of pelletized circuit elements.

In the evolution of simple to complex modular circuitry, the next step beyond the two-dimensional pellet arrangement is a complex three-dimensional pellet assembly. FIGURE 18 shows such an asesmbly which can be formed by the stacking of two-dimensional arrays. The "Universal Connector Strip" of FIGURE 14 is again used as the interconnecting medium. Using the same pellet spacing as previously described, a one-cubic-inch module of the general type shown in FIGURE 18 has a theoretical maximum of 504 pellet positions. It is obvious, however, that some number of pellet positions must be occupied by insulators so that adjacent planar levels can be isolated. Also, shielding planes may be required to separate circuit sections. Assuming a component use factor of 75% therefor, the actual density would be 375 elements per cubic inch, or more than 600,000 elements per cubic foot.

An important criterion of modular circuitry, as taught by this invention, is the conformance of module size to a dimensioning system which results in good fits among modules. A solution to this problem is provided in a novel concept called the "binary modular dimension system." In this system, module heights, lengths, and widths are fixed at 1, 2, 4, 8, etc., times the basic modular dimension, the latter being 0.150 inch in the illustrations used herein. In any one height category, it can be shown that good fits and high module density may be obtained from a random selection of a number of modules following the binary system on length and width dimensions.

As hereinbefore stated, the pellet assemblies described by this invention are adaptable to mold casting as well as potting in an insulating shell. It has been found that thin-walled epoxy shells are particularly suitable for high production quantities of modules. These twin-walled shells permit the maximum use of internal space while permitting full control of the external modular dimensions. Potting compound is efficiently introduced into said insulating shell and allowed to surround the pellets, thereby filling all unoccupied space. The resulting module, while of uniform exterior geometry, possesses excellent mechanical, chemical, and thermal properties, coupled with a low rate of moisture absorption. For low production rates, the mold casting technique is advantageous, and it affords environmental protection equal to that of the potting process.

The modular circuitry concept of the present invention, as hereinabove described in several of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. In a microminiature electronic network, a plurality of discrete circuit elements shaped as cylindrical pellets, said pellets being microminiaturized with determined dimensions and having conductive end surfaces, a pair of differently shaped preformed flat terminal members of determined thickness, one of said pair of terminal members connected to one of said pellet end surfaces, said other of said pair of said terminal members connected to said other of said pellet end surfaces, said pair of terminal members connected in parallel planes, the contacting head section of each of said terminal members having square geometry with outside dimensions substantially equivalent to the diameter of said pellets and having a square central portion thereof cut out, each of said terminal members further having coplanar dependencies integrally formed with said head section while extending downward therefrom, the position of said dependencies for defining the polarity of said pellets which are interconnected within said network, the lateral and longitudinal spacing of said dependencies providing a terminal grid system, said dependencies further providing for alignment, orientation, and termination of the network formed by said pellets, and a plurality of such network assemblies being adaptable to formation of a multi-dimensional module having determined dimensions, said module being capable of total encapsulation for environmental protection.

2. A microminiature module comprising: a plurality of predeterminately shaped circuit means electrically interconnected in said module, each of said circuit means having conductive end surfaces; an A-shaped, flat terminal member of predetermined thickness connected to one end of said interconnected circuit means; said terminal member having substantially square peripheral dimensions; a P-shaped, flat terminal member of predetermined thickness connected to the remaining end surfaces of each of said circuit means, said terminal members having substantially square peripheral dimensions, said A-shaped terminal member and said P-shaped terminal member shaped for providing polarity identification, alignment and orientation of said plurality of interconnected circuit means and further providing a predetermined terminal grid system; and means encapsulating said module providing environmental protection.

References Cited by the Examiner

UNITED STATES PATENTS

| 2,613,244 | 10/52 | Del Camp | 339—17 |
| 2,619,519 | 11/52 | Marks | 317—261 |
| 2,685,016 | 7/54 | Blackburn | 339—275 X |
| 2,866,136 | 12/58 | Coda et al. | 317—101 |
| 2,953,766 | 9/60 | Clewes | 339—17 |
| 3,112,432 | 11/63 | Martin et al. | 317—234 |
| 3,134,930 | 5/64 | Wright | 317—101 |
| 3,142,000 | 7/64 | Bernstein | 317—101 |

FOREIGN PATENTS

| 1,081,367 | 12/54 | France. |
| 786,624 | 11/57 | Great Britain. |

OTHER REFERENCES

"Etched Wiring," page 145, September 1955, Electronics Magazine.

JOHN F. BURNS, *Primary Examiner.*

JOHN P. WILDMAN, *Examiner.*